US011230966B2

(12) United States Patent
Köhnlein et al.

(10) Patent No.: US 11,230,966 B2
(45) Date of Patent: Jan. 25, 2022

(54) COMPRESSOR ARRANGEMENT FOR AN INFERNAL COMBUSTION ENGINE AND METHOD FOR OPERATING A COMPRESSOR ARRANGEMENT

(71) Applicant: AUDI AG, Ingolstadt (DE)

(72) Inventors: Maximilian Köhnlein, Wettstetten (DE); Robert Solbeck, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/975,473

(22) PCT Filed: Jan. 28, 2019

(86) PCT No.: PCT/EP2019/051992
§ 371 (c)(1),
(2) Date: Aug. 25, 2020

(87) PCT Pub. No.: WO2019/162044
PCT Pub. Date: Aug. 29, 2019

(65) Prior Publication Data
US 2021/0017899 A1    Jan. 21, 2021

(30) Foreign Application Priority Data
Feb. 26, 2018  (DE) ...................... 10 2018 202 845.1

(51) Int. Cl.
*F02B 37/16*    (2006.01)
(52) U.S. Cl.
CPC .................................. *F02B 37/16* (2013.01)

(58) Field of Classification Search
CPC ........ F02B 37/16; F02B 37/164; F02B 37/00; Y02T 10/12; F05D 2260/601;
(Continued)

(56) References Cited

U.S. PATENT DOCUMENTS 9,086,036 B2    7/2015  Inoguchi et al.
2008/0267765 A1   10/2008  Chen
(Continued)

FOREIGN PATENT DOCUMENTS

DE    10 2011 104 424 A1    12/2012
DE    102011104424    *  12/2012    ............ G01M 3/025
(Continued)

OTHER PUBLICATIONS

German Examination Report dated Oct. 23, 2018 in corresponding German Application No. 10 2018 202 845.1; 14 pages including Machine-generated Translation attached.
(Continued)

*Primary Examiner* — Audrey B. Walter
*Assistant Examiner* — Edward Bushard
(74) *Attorney, Agent, or Firm* — Maier & Maier, PLLC (57) ABSTRACT

A compressor arrangement for an internal combustion engine, including a compressor which is located in a compressor housing and has a low pressure side and a high pressure side, and includes a vacuum supply device which has: a propellant channel which has a nozzle and is fluidically connected on one side via a propellant inlet connection to the high pressure side of the compressor and on the other side via a propellant outlet connection to the low pressure side of the compressor; and a vacuum channel opening into the propellant channel fluidically between the propellant inlet connection and the propellant outlet connection.

15 Claims, 2 Drawing Sheets

(58) Field of Classification Search
CPC ............ F05D 2220/40; F02M 25/0809; F02M 35/10118; F02M 35/10222; F02M 25/0872; F02M 35/10157; F02M 35/10229; F04F 5/20
See application file for complete search history.

(56) References Cited

U.S. PATENT DOCUMENTS

2016/0305377 A1   10/2016   Stefaniak et al.
2016/0377038 A1   12/2016   Bittner

FOREIGN PATENT DOCUMENTS

| DE | 20 2014 105 108 U1 | 11/2014 | | |
|---|---|---|---|---|
| DE | 10 2017 204 785 A1 | 10/2017 | | |
| DE | 102017204785 | * 10/2017 | ............ | B60K 15/035 |
| JP | 2015-187438 A | 10/2015 | | |

OTHER PUBLICATIONS

International Search Report dated Mar. 25, 2019 in corresponding International Application No. PCT/EP2019/051992; 7 pages.
International Search Report and Written Opinion dated Mar. 25, 2019 in corresponding International Application No. PCT/EP2019/051992; 21 pages.
International Preliminary Report on Patentability dated Aug. 27, 2020, in connection with corresponding International Application No. PCT/EP2019/051992 (7 pp.).
Chinese Office Action dated Sep. 2, 2021, in connection with corresponding CN application No. 201980015291.2 (19 pp., including machine-generated English translation).

* cited by examiner

COMPRESSOR ARRANGEMENT FOR AN INFERNAL COMBUSTION ENGINE AND METHOD FOR OPERATING A COMPRESSOR ARRANGEMENT

FIELD

The disclosure relates to a compressor arrangement for an internal combustion engine, comprising a compressor which is located in a compressor housing and has a low pressure side and a high pressure side, and comprising a vacuum supply device which has: a propellant channel which has a nozzle and is fluidically connected on one side via a propellant inlet connection to the high pressure side of the compressor and on the other side via a propellant outlet connection to the low pressure side of the compressor; and a vacuum channel opening into the propellant channel fluidically between the propellant inlet connection and the propellant outlet connection, the propellant channel being designed in a housing which is separate from the compressor housing, on which the propellant inlet connection with a first connection and the propellant outlet connection with a second connection are designed as a plug connection. The disclosure relates further to a method for operating a compressor arrangement.

BACKGROUND

For example, the publication DE 20 2014 105 108 U1 is known from the prior art. It describes an engine system comprising: a first and a second aspirator which comprise a suction tap in a throat of the aspirator, a suction tap in a diverging cone of the aspirator and a suction tap in a straight tube downstream of the diverging cone, respectively, the first aspirator comprising a motive inlet coupled to an engine suction and a mixed flow outlet coupled to the suction downstream of a main throttle, and the second aspirator comprising a mixed flow outlet coupled to the suction downstream of the motive inlet of the first aspirator and a motive inlet coupled to the suction downstream of the main throttle.

The publication JP 2015-187438 A describes a device for purging evaporative fuel out of a fuel tank. Here, a purging device is integrated in an inlet passage of a compressor, the purging device extracting via a fluid communication part of the charge air downstream of the compressor and the evaporative fuel being supplied from the fuel tank to the compressor.

Furthermore, the publication U.S. Pat. No. 9,086,036 B2 is known from the prior art.

According to the disclosure, this is achieved with a compressor arrangement for an internal combustion engine. According to the invention, the first connection and the second connection are designed at the compressor housing, the housing being designed for immediate attachment to the compressor housing.

SUMMARY

Basically, it is provided that the propellant channel is designed in a housing which is separate from the compressor housing on which the propellant inlet connection and/or the propellant outlet connection is/are designed as a plug connection, the housing being designed for immediate attachment to the compressor housing. The compressor arrangement can be associated to the internal combustion engine and, in this respect, be part of the internal combustion engine. Preferably, the compressor arrangement serves to supply of compressed fresh gas for the internal combustion engine. For this purpose, the compressor arrangement includes the compressor to which fresh gas is supplied on the low pressure side at a first pressure. The compressor compresses the supplied fresh gas and, in turn, supplies it on the high pressure side for the internal combustion engine, i. e., at a second pressure which is higher than the first pressure. The fresh gas can exist in a form of fresh air, but also as a fresh air-exhaust gas mixture. In the latter case, for example, the internal combustion engine is provided with an external exhaust gas recirculation. For example, the compressor or the compressor arrangement can be part of an exhaust gas turbocharger which is associated to the internal combustion engine.

Additionally to the compressor, the compressor arrangement has the vacuum supply device by means of which vacuum can be supplied or is supplied for a vacuum consumer. For example, the vacuum consumer is present in form of a purging device for a filter, in particular for an activated carbon filter, and/or as a ventilation device, in particular as a crank case ventilation device.

The vacuum supply device has the propellant channel by means of which a propellant can be conducted for supplying a vacuum. The fresh gas which is compressed by means of the compressor is used as propellant for the vacuum supply. For this purpose, the propellant channel is fluidically connected on one side to the high pressure side of the compressor and on the other side to the low pressure side of the compressor. The vacuum supply device has the propellant inlet connection for connection of the propellant channel to the high pressure side and the propellant outlet connection for connection to the low pressure side.

The vacuum supply device, in particular the propellant channel, represents a bypass for the compressor by means of which already compressed fresh gas can be conducted or is conducted from the high pressure side back to the low pressure side. The vacuum channel opens into the propellant channel for supplying the vacuum. In the vacuum channel or at a vacuum connection of the vacuum supply device, which exists on the side of the vacuum channel which is opposed to the propellant channel, the vacuum is provided with a passage of propellant or fresh gas through the propellant channel.

The nozzle is arranged in the propellant channel for supplying of the vacuum. The propellant inlet connection is fluidically connected to the propellant outlet connection by means of the nozzle. For example, the vacuum channel opens into the nozzle or downstream of the nozzle, in particular immediately downstream of the nozzle, into the propellant channel. In the first case, the nozzle is present in a form of a venturi nozzle on which advantage is taken of the venturi effect so as to supply the vacuum in the vacuum channel, and hence at the vacuum connection, because of the propellant which is flowing through the propellant channel.

In the case of the venturi nozzle, the nozzle represents a reduction of the cross section into which the propellant channel opens. Particularly preferably, a continuous reduction of the cross section is formed until a smallest flow cross section to which a continuous increase of the flow cross section, i. e., a decrease of the reduction of the cross section, is connected. Preferably, the propellant channel opens into the nozzle in the region of the smallest flow cross section, however, at least in the region of the reduction of the cross section.

If the propellant channel downstream of the nozzle opens into the propellant channel, then the nozzle is present as a propulsion jet nozzle of a jet pump or a propulsion jet pump. In the case of the jet pump, the propulsion jet nozzle opens into a mixing chamber which has a greater flow cross section than an outlet opening of the nozzle by means of which the nozzle is connected to the mixing chamber. Thus, in the case of the propulsion jet nozzle, there is a sudden widening of the flow cross section. The vacuum channel also opens into the mixing chamber, such that, in case of a flow of propellant through the propellant channel, the fluid which is present in the vacuum channel is dragged by the propellant in the direction of the propellant outlet connection, in particular by means of a pulse input.

The propellant channel, and hence the nozzle, is located in the housing which exists or is designed separately from the compressor housing. The housing, which is part of the vacuum supply device, can be mounted at the compressor housing. In this respect, before an operation of the compressor arrangement—provided that the supply of vacuum is requested—the housing of the vacuum supply device is to be arranged such that the propellant channel is fluidically connected on one side to the high pressure side and on the other side to the low pressure side of the compressor.

The design of the propellant channel in the separate housing, which can be designed in one piece or in multiple pieces, has the advantage that the vacuum supply device can be replaced easily. Furthermore, the vacuum supply device can be mounted in a particularly efficient way, in particular if the vacuum supply device is completely designed in the housing. In this case, the nozzle and the vacuum channel are designed in the housing additionally to the propellant channel.

Preferably, at least one region of the propellant channel, in which the nozzle is located, and the vacuum channel are located in a part of the housing which is embodied integrally and/or from a uniform material. Here, both the region of the propellant channel and the nozzle and the vacuum channel are represented by a recess of the housing. Particularly preferably, the housing part can be present as an injection molding component, such that the region of the propellant channel, the nozzle and the vacuum channel are formed during a common injection molding operation.

Both the propellant inlet connection and the propellant outlet connection are designed at the housing. At least one of the two connections, i. e., either the propellant inlet connection or the propellant outlet connection, is designed as a plug connection by means of which a fluid communication can be made by plugging in. In this respect, it may be provided that the propellant inlet connection or the propellant outlet connection are designed as or have a plug connection protrusion.

Of course, alternatively it may be provided that the propellant inlet connection or the propellant outlet connection has a plug connection receptacle for receiving such a plug connection protrusion. It may also be provided that both the propellant inlet connection and the propellant outlet connection are present as a plug connection, respectively. However, particularly preferably, only one of the connections, particularly preferably, the propellant outlet connection, is designed as such a plug connection. The plug connection allows a fluid communication to be effected with a high impermeability, which is furthermore very tolerant to displacements, in particular of the vacuum supply device regarding the compressor housing.

Furthermore, it is provided that the housing is designed for immediate attachment to the compressor housing. This means that the housing is arranged with direct contact with the compressor housing and is attached thereto when mounting the vacuum supply device. Thus, an immediate connection between the housing and the compressor housing is provided and formed. The attachment of the housing to the compressor housing is made, for example, by means of at least one screw, the screw being engaged on one side in the housing and on the other side in the compressor housing. For example, the screw extends completely through a mounting flange of the housing and, in certain areas, engages in the compressor housing in which it is hold by means of a thread.

The described design of the compressor arrangement, in particular of the vacuum supply device and of the housing, allows an easy mounting with an excellent impermeability at the same time. In order to effect the fluid communication of the connection which is designed as a plug connection it is only necessary to plug two elements one into another. Moreover, the compressor arrangement allows a good diagnosability, as the functionability, in particular the impermeability, of the vacuum supply device can be diagnosed by means of a pressure sensor which measures the pressure in the compressor arrangement, for example in the vacuum channel, at the vacuum connection or on the high pressure side of the compressor. Generally, a pressure sensor exists anyway so as to determine the pressure of the fresh gas, which then may be also referred to as charge air.

Additionally or alternatively, the vacuum supply device may include another pressure sensor by means of which the pressure in the vacuum channel is determined. In this respect, only the pressure sensor of the compressor, which generally exists anyway, and/or the additional pressure sensor associated to the vacuum channel are necessary for a complete diagnosis or leak test of the vacuum supply device. Moreover, a high operational safety is achieved in this respect by means of the described compressor arrangement.

The invention provides that the propellant inlet connection can be fluidically connected to a first connection and the propellant outlet connection can be fluidically connected to a second connection, the first connection and the second connection being designed at the compressor housing. In this respect, via the first connection, propellant can be supplied to the vacuum supply device or the propellant channel and can be extracted via the second connection. In other words, the propellant channel is fluidically connected, or at least can be fluidically connected, via the first connection to the high pressure side of the compressor and via the second connection to the low pressure side of the compressor.

The two connections, i. e., the first connection and the second connection, are present at the compressor housing, respectively. In this respect, the vacuum supply device or its housing is arranged immediately at the compressor housing, in particular such that the propellant inlet connection is fluidically connected to the first connection and the propellant outlet connection is fluidically connected to the second connection. By means of such an arrangement of the vacuum supply device at the compressor housing, the cost-effective manufacturing, the easy mounting and the excellent diagnosability are achieved, respectively.

For example, the first connection is fluidically connected to a flow damper which is located and/or designed in the compressor housing. The flow damper serves for dampening in particular of high-frequency noise. For example, the flow damper works as a Helmholtz resonator and/or as a cavity resonator. In other words, the propellant inlet connection is immediately connected to the flow damper and/or at least to the high pressure side of the compressor by means of the same. It may be provided that the propellant throughput, i. e., the propellant amount per time unit which is supplied to the vacuum supply device, is selected such that, by the extraction of the propellant out of the flow damper, the acoustic effect of the latter is optimized. Particularly preferably, the efficiency of the compressor is not affected, in particular is not deteriorated this way.

Another preferred embodiment of the invention provides that the propellant outlet connection includes a plug connection protrusion and the second connection includes a plug connection receptacle for receiving the plug connection protrusion. In other words, the plug connection protrusion is present at the housing of the vacuum supply device, in particular, it is embodied from the same material and/or integrally with it. This means that, preferably, the plug connection protrusion is formed together with the propellant channel, the nozzle and the vacuum channel during the injection molding operation which has already been mentioned above.

In contrast, the second connection includes the plug connection receptacle which is designed such that, after an arrangement as intended of the plug connection protrusion in the plug connection receptacle, the fluid communication is effected between the propellant outlet connection and the second connection, and thus between the propellant channel and the low pressure side of the compressor. Such a design allows for particularly easy mounting.

A further development of the invention provides that the propellant inlet connection and the first connection each have a passage opening which extends through a contact surface, such that a fluid communication between the propellant inlet connection and the first connection can be effected by bringing the contact surfaces into flush contact with each other. In this respect, the passage opening of the propellant inlet connection extends through a contact surface which is designed at the housing of the vacuum supply device, the passage opening of the first connection extends through a contact surface which is designed at the compressor housing. Preferably, the contact surfaces are completely level in each case. Particularly preferably, the passage openings are designed closed at the edges in the corresponding contact surface in each case, i. e., they include a continuous edge in the circumferential direction.

The fluid communication between the propellant inlet connection and the first connection shall be capable of being made by bringing the contact surfaces into flush contact with each other. For this purpose, the contact surfaces are preferably pressed close together and/or are sealed against each other by means of a sealing. The fluid communication formed by bringing the contact surfaces into flush contact with each other has a relatively low tolerance to displacements, in particular compared to the fluid communication effected by means of the plug connection. In this respect, in case of a releasing of the housing from the compressor housing, in particular an unintentional releasing, a permeability is produced first on the side of the propellant inlet connection. Only in case of a further displacement, may the fluid communication existing on the side of the propellant outlet connection leak.

However, by means of the already described pressure sensor or the additional pressure sensor, the interruption of the fluid communication between the propellant inlet connection and the first connection can already be diagnosed such that an error can be detected in time and visualized. This way an escape of the fluid, which has been sucked in by the vacuum supply device via the propellant channel, out of the compressor arrangement is avoided. Instead, this is supplied reliably via the propellant outlet connection to the compressor even when the fluid communication between the propellant inlet connection and the first connection is already interrupted or leaking. In this respect, the excellent diagnosability of the vacuum supply device, which has already been mentioned, is implemented.

Another preferred design of the invention provides that the propellant inlet connection includes an axial ring sealing interacting with the first connection and the propellant outlet connection includes a radial ring sealing interacting with the second connection. The axial ring sealing engages completely around the propellant inlet connection and also around the first connection after mounting in the circumferential direction. The same applies for the radial ring sealing and the propellant outlet connection as well as the second connection. By the term axial ring sealing, a ring sealing is to be understood where the sealing effect is accomplished by axial elastic compression. Accordingly, the radial ring sealing is a ring sealing where the sealing effect is caused by elastic radial compression.

Preferably it is provided that the axial ring sealing is in sealing contact with the contact surfaces of the propellant inlet connection and the first connection or at least with one of these contact surfaces so as to accomplish the sealing effect. For example, the axial ring sealing is located in a sealing receptacle which extends through one of the contact surfaces and is in sealing contact with the respective other contact surface after mounting. Obviously, such sealing receptacles can also be present in both contact surfaces as long as it is assured that the propellant inlet connection and the first connection are hermetically connected to each other after mounting.

Preferably, the radial ring sealing is designed such that it is present at the plug connection protrusion and engages around the same in the circumferential direction. The radial ring sealing is inserted together with the plug connection protrusion in the plug connection receptacle and, subsequently, is in sealing contact, in particular continuously in the circumferential direction, with a wall which delimitates the plug connection receptacle in the radial direction. For example, a sealing receptacle is designed in the plug connection protrusion in which the radial ring sealing is located so as to realize a reliable attachment of the radial ring sealing, and thus avoid a loss of the radial ring sealing.

Such a choice of the sealings, i. e., the provision of the axial ring sealing at the propellant inlet connection and the provision of the radial ring sealing at the propellant outlet connection, assures the reliable diagnosability, which has already been described above, by being the fluid communication of the propellant outlet connection with the second connection much more tolerant to displacements than the fluid communication between the propellant inlet connection and the first connection by means of the axial ring sealing because of the radial ring sealing.

Therefore, in case of a displacement of the vacuum supply device, in particular of the housing, with respect to the compressor housing starting from a first position in which both fluid communications are impermeable, in the direction of a second position in which both fluid communications are interrupted or leaking, first the fluid communication between the propellant inlet connection and the first connection and only later the fluid communication between the propellant outlet connection and the second connection becomes leaking.

Another preferred embodiment of the invention provides that the propellant channel includes a deviation within the housing. Such a design assures, on the one hand, a compact construction form of the vacuum supply device, and thus of the compressor arrangement. On the other hand, a very easy and quick mounting is possible, as the mounting of the vacuum supply device or of its housing is preferably effected in a single mounting direction. Therefore, in order to effect the fluid communication between the connections of the housing and the connections of the compressor housing, only the displacement in the mounting direction is necessary. With the displacement, first of all, the plug connection protrusion will engage in the plug connection receptacle and, subsequently, the contact surfaces of the propellant inlet connection and of the first connection will get in flush sealing contact.

Another embodiment of the invention provides that the deviation is formed by means of a lid of the housing which delimits the propellant channel in certain areas. In this respect, the housing is formed of multiple pieces and includes a base element and the lid. For example, a part of the propellant channel, in particular a large part of the propellant channel, is located in the base element. Preferably, the vacuum channel, at least in certain areas, and the nozzle are further arranged in the base element. The lid is releasably or unreleasably connected to the base element. For example, the releasable connection is effected in a positively locking manner, in particular by means of a latching connection. For example, the unreleasable connection can be realized by welding. The usage of the lid allows an easy and cost-effective design of the housing, for example by injection molding, the base element and the lid being manufactured separately from each other.

In a further embodiment of the invention it is provided that a longitudinal central axis of the propellant channel at the propellant inlet connection is perpendicular to a longitudinal central axis of the propellant channel at the propellant outlet connection or to a plane receiving the same. In other words, the propellant inlet connection and the propellant outlet connection are oriented in different directions. There is an angle of 90° between said longitudinal central axis. This allows for easy mounting by inserting the plug connection protrusion of the propellant outlet connection in the plug connection receptacle of the compressor housing until the contact surfaces of the propellant inlet connection and of the first connection are in contact with each other.

Finally, it can be provided within the scope of a further design of the invention that the housing can be fastened by means of at least one screw, a longitudinal central axis of a receiving opening of the housing for receiving the screw being located parallel to a longitudinal central axis of the propellant channel at the propellant inlet connection or a longitudinal central axis of the propellant channel at the propellant outlet connection. The screw serves for attachment of the housing, for example, at the compressor housing. The housing is provided with the receiving opening for receiving the screw which has dimensions such that a shaft of the screw can be passed through it, whereas a head of the screw is in contact with an edge which delimits the receiving opening or the edge represents an end stop for the head.

Preferably, the receiving opening is completely straight in the direction of its longitudinal central axis. The longitudinal central axis of the receiving opening runs parallel to the longitudinal central axis of the propellant channel on the side of the propellant inlet connection and/or on the side of the propellant outlet connection. This way, a mounting force, which can be caused by means of the screw acts between the housing and the compressor housing in a direction which is opposed to a removing of the connections of the housing from the connections of the compressor housing.

In other words, the housing is attached by means of the screw at the compressor housing such that the contact surfaces of the propellant inlet connection and of the first connection are forced against each other. For this purpose, particularly preferably, the longitudinal central axis of the receiving opening for the screw is perpendicular to both contact surfaces. In this respect, such a design assures an excellent impermeability of the compressor arrangement.

The invention relates further to a method for operating a compressor arrangement for an internal combustion engine, in particular a compressor arrangement according to the embodiments within the scope of this specification, the compressor arrangement including a compressor which is located in a compressor housing and has a low pressure side and a high pressure side, and a vacuum supply device which has: a propellant channel which has a nozzle and is fluidically connected on one side via a propellant inlet connection to the high pressure side of the compressor and on the other side via a propellant outlet connection to the low pressure side of the compressor; and a vacuum channel opening into the propellant channel fluidically between the propellant inlet connection and the propellant outlet connection, the propellant channel being designed in a housing which is separate from the compressor housing, on which the propellant inlet connection with a first connection and the propellant outlet connection with a second connection are designed as a plug connection.

According to the invention, the first connection and the second connection are designed at the compressor housing, the housing being designed for immediate attachment to the compressor housing, and a pressure being measured by means of a pressure sensor and a leakage being detected in case of falling below or exceeding a threshold by the pressure.

Reference has already been made to the benefits of such a procedure or of such a design of the compressor arrangement. Both the compressor arrangement and the method for operating the same can be further developed according to the embodiments within the scope of this specification, such that reference is made to them in this respect.

For example, the pressure sensor serves for measuring the pressure in the vacuum channel, at the vacuum connection or on the high pressure side of the compressor. If the measured pressure differs from the threshold or falls below or exceeds it, then it can be assumed that the leakage or another failure exists.

BRIEF DESCRIPTION OF THE DRAWINGS

The disclosure will be explained in more detail with reference to the embodiments illustrated in the drawings, without any limitation of the disclosure.

DETAILED DESCRIPTION

Figure 1:
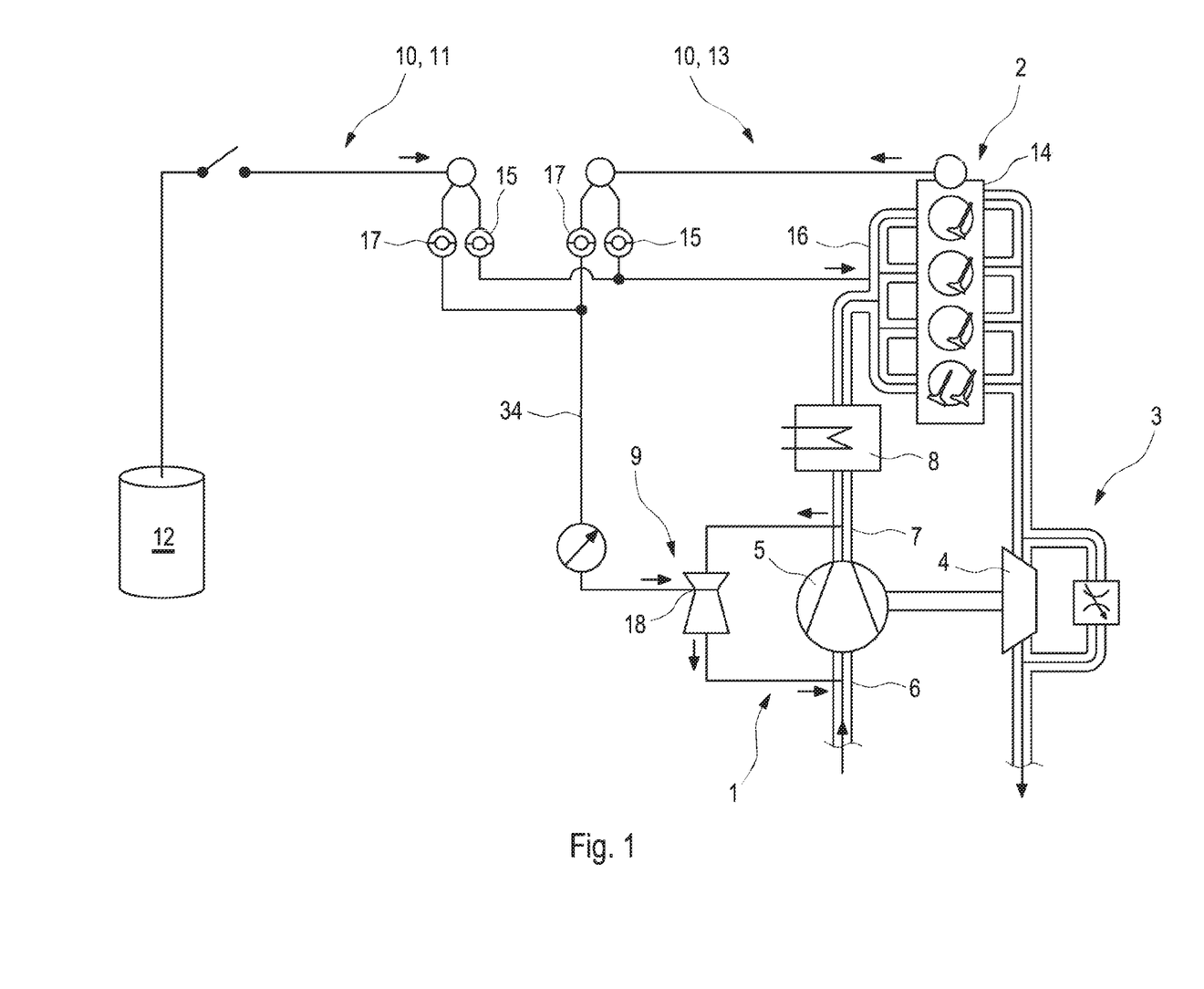
FIG. 1 shows a schematic representation of a compressor arrangement for an internal combustion engine which includes a vacuum supply device for providing a vacuum for at least one vacuum consumer.

FIG. 1 shows a schematic representation of a compressor arrangement 1 for an internal combustion engine 2. The compressor arrangement 1 is part of an exhaust gas turbocharger 3 which includes a turbine 4 and a compressor 5, the latter being part of the compressor arrangement 1. Exhaust gas of the internal combustion engine 2 can be supplied to the turbine 4. Enthalpy and/or flow energy contained in the exhaust gas is converted into kinetic energy by means of the turbine 4 which, in turn, serves for driving the compressor 5. The compressor 5 serves for compression of fresh gas, the fresh gas being supplied to the compressor 5 on a low pressure side 6. The fresh gas which is compressed by means of the compressor 5 is available on its high pressure side 7 for the internal combustion engine 2. A charge air cooler 8 can be provided fluidically between the high pressure side 7 of the compressor 5 and the internal combustion engine 2.

A vacuum supply device 9 is provided fluidically parallel to the compressor 5 which serves for supplying vacuum for at least one vacuum consumer 10, for two vacuum consumers 10 in the embodiment which is represented here. One of the vacuum consumers 10 is present as a purging device 11 for a filter 12, the filter 12 being designed preferably as an activated carbon filter. Another one of the vacuum consumers 10 is designed as a ventilation device 13 which serves for ventilation of a cylinder crankcase 14 of the internal combustion engine 2.

The vacuum consumer 10 or the vacuum consumers 10 are connected by means of check valves 15 to a suction tube 16 of the internal combustion engine 2 or an inlet manifold, respectively. Additionally, the vacuum consumer 10 or the vacuum consumers 10 are connected by means of check valves 17 to a vacuum connection 18 of the vacuum supply device 9. In this respect, the vacuum consumer 10 or the vacuum consumers 10 are always fluidically connected to the suction tube 16 or the vacuum connection 18 depending on where a greater vacuum exists.

Figure 2:
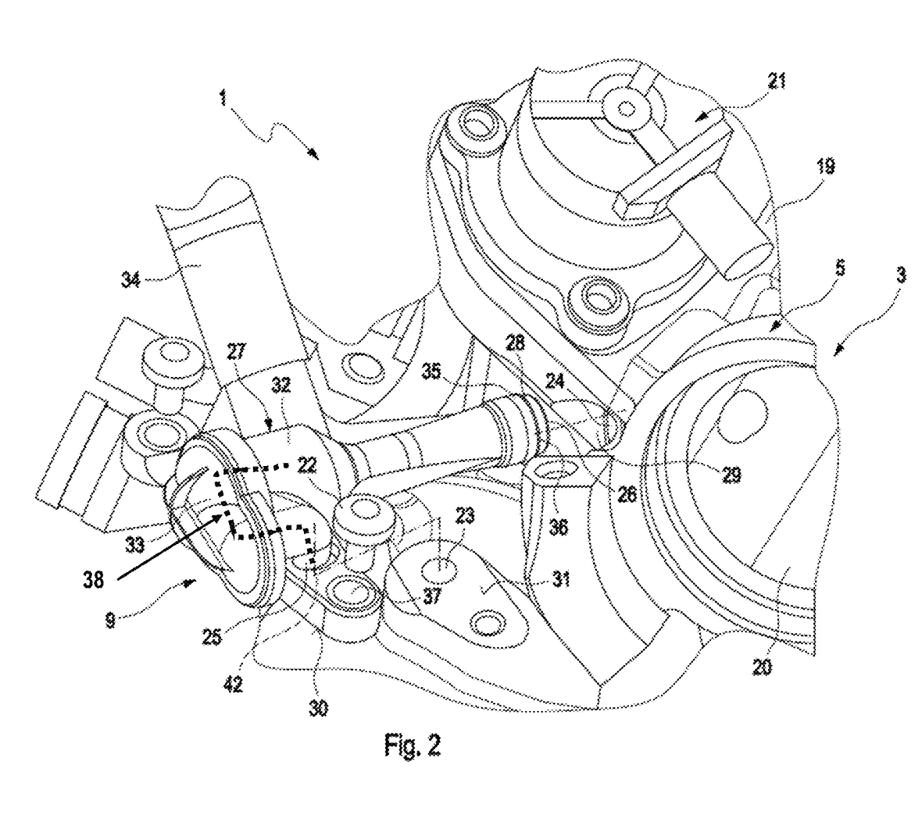
FIG. 2 shows a schematic representation of a region of the compressor arrangement in an exploded view.

FIG. 2 shows a schematic representation of a region of the compressor arrangement 1 by way of an explosive view. The compressor 5 of the exhaust gas turbocharger 3 and a compressor housing 19 of the compressor 5 can be seen in it. The compressor 5 includes a fresh gas inlet channel 20 which is designed in the compressor housing 19. The low pressure side 6 of the compressor 5 is fluidically connected to an external environment of the compressor arrangement 1 via the fresh gas inlet channel 20, preferably by means of a filter or an air filter. At least one additional attachment element 21 can be fastened to the compressor housing 19, for example by means of at least one screw.

Moreover, the vacuum supply device 9 is immediately attached to the compressor housing 9, i. e., preferably again by means of a screw 22. A first connection 23 and a second connection 24 are present at the compressor housing 19, the first connection 23 being fluidically connected to the high pressure side 7 of the compressor 5 within the compressor housing 19 and the second connection 24 also being fluidically connected within the compressor housing 19 to the low pressure side 6. For example, the second connection 24 within the compressor housing 19 is fluidically connected to the fresh gas inlet channel 20, in particular it opens into the same.

The vacuum supply device 9 includes a propellant inlet connection 25 and a propellant outlet connection 26. The propellant inlet connection 25 is fluidically connected to the first connection 23 and the propellant outlet connection 26 is fluidically connected to the second connection 24 in case of a mounting of the vacuum supply device 9 at the compressor housing 19. Both the propellant inlet connection 25 and the propellant outlet connection 26 are present at a housing 27 of the vacuum supply device 9.

The propellant outlet connection 26 is designed as a plug connection and insofar includes a plug connection protrusion 28 which is provided and designed for reception in a plug connection receptacle 29 of the second connection 24. In contrast, the propellant inlet connection 25 and the first connection 23 include a contact surface 30 or 31, respectively. The fluid communication between the propellant inlet connection 25 and the first connection 23 is effected by bringing these two contact surfaces 30 and 31 into flush contact with each other.

It can be seen that the housing 27 is made of multiple pieces and consists of a base element 32 and a lid 33. Preferably, the lid 33 is unreleasably connected to the base element 32, though it is manufactured separately from the same. In this respect, the base element 32 and the lid 33 are only connected to each other after their manufacturing. The vacuum connection 18, to which the at least one vacuum consumer 10 can be connected via a vacuum conduct 34, is designed at the housing 27, at the base element 32 in the embodiment which is represented here.

A propellant channel 38 is designed in the housing 27 by means of which the propellant inlet connection 25 and the propellant outlet connection 26 are fluidically connected to each other within the housing 27. The propellant channel 38 is present mostly in the base element 32. However, it is delimited in certain areas by the lid 33, whereby a deviation is realized.

At least one nozzle is present within the housing 27 in the flow path between the propellant inlet connection and the propellant outlet connection 26, i. e., in the propellant channel. In the embodiment which is represented here, the nozzle is designed as a propulsion jet nozzle which opens into a mixing chamber to which the vacuum connection 18 is also fluidically connected via a vacuum channel. In case of a flow of propellant through the propellant channel, fluid is sucked in by the vacuum channel and is dragged by the propellant in the direction of the propellant outlet connection 26. Thus, vacuum is provided at the vacuum connection 18.

The propellant inlet connection 25 includes an axial ring sealing 42 (which cannot be seen here) and the propellant outlet connection 26 includes a radial ring sealing 35. The axial ring sealing is located in a sealing receptacle and the radial ring sealing 35 is located in a further sealing receptacle 36. The sealing receptacles, in particular the sealing receptacle 36, are designed in the housing 27, in particular in the base element 32. It can be seen that the propellant inlet connection 25 and the propellant outlet connection 26 are angled against each other, such that their longitudinal central axis or planes housing the longitudinal central axis are situated with an angle one on top of the other which is greater than 0° and smaller than 180°. For example, the angle is at least 75° and at the most 105°, at least 80° and at the most 100° or essentially or exactly 90°.

Preferably, the screw which has already been described above, by means of which the vacuum supply device 9 is attached to the compressor housing 19, includes a longitudinal central axis which runs parallel to a longitudinal central axis of the propellant channel on the side of the propellant inlet connection 25, but is angled with respect to a longitudinal central axis of the propellant channel on the side of the propellant outlet connection 26 or a plane receiving this longitudinal central axis, the angle being greater than 0° and smaller than 180°. For example, the angle is again at least 75° and at the most 105°, at least 80° and at the most 100°, at least 85° and at the most 95° or essentially or exactly 90°. Thus, a particularly good sealing effect, in particular of the axial ring sealing, is accomplished. According to the orientation of the screw 22, a receiving opening 37 for receiving the screw 22 with its longitudinal central axis is also oriented parallel to the longitudinal central axis of the propellant channel on the side of the propellant inlet connection 25.

The described compressor arrangement 1 has the advantage that, on the one hand, the vacuum supply device 9 has a compact construction and is also replaceable. On the other hand, a high operational safety is provided by the propellant outlet connection 26 being designed as a plug connection, whereas the fluid communication between the propellant inlet connection 25 and the first connection 23 is effected by bringing the contact surfaces 30 and 31 into flush contact with each other. Thus, a particularly easy detection of a permeability or leakage is possible.

The invention claimed is:

1. A compressor arrangement for an internal combustion engine, comprising:
   a compressor which is arranged in a compressor housing, the compressor having a low pressure side and a high pressure side, and
   a vacuum supply device comprising a propellant channel and a vacuum channel,
   wherein the propellant channel comprises a nozzle which is fluidically connected to a propellant inlet connection and to a propellant outlet connection,
   wherein the vacuum channel fluidically opens into the propellant channel fluidically between the propellant inlet connection and the propellant outlet connection,
   wherein the propellant inlet connection connects the propellant channel to the high pressure side of the compressor at a first connection, and the propellant outlet connection connects the propellant channel to the low pressure side of the compressor at a second connection,
   wherein the propellant channel is arranged in a propellant channel housing which is separate from the compressor housing and which is configured to attach to the compressor housing,
   wherein, at the second connection, the propellant outlet connection is designed to plug into a plug connection receptacle formed in the compressor housing,
   wherein a longitudinal central axis of the propellant channel at the propellant inlet is different from a longitudinal central axis of the propellant channel at the propellant outlet, and
   wherein a lid of the propellant channel housing, which delimits the propellant channel in certain areas, forms a deviation which renders the longitudinal central axis of the propellant channel at the propellant inlet different from the longitudinal central axis of the propellant channel at the propellant outlet.

2. The compressor arrangement according to claim 1, wherein the longitudinal central axis of the propellant channel at the propellant inlet connection is perpendicular to the longitudinal central axis of the propellant channel at the propellant outlet connection or to a plane receiving the propellant outlet connection.

3. The compressor arrangement according to claim 1, wherein the propellant outlet connection is designed as a plug connection protrusion which is insertable into the plug connection receptacle.

4. The compressor arrangement according claim 3, wherein, at the first connection, the propellant inlet connection is designed to mount flush against a through opening which extends through a contact surface of the compressor housing.

5. The compressor arrangement according to claim 3, wherein a longitudinal central axis of the propellant channel at the propellant inlet is different from a longitudinal central axis of the propellant channel at the propellant outlet.

6. The compressor arrangement according to claim 5, wherein a lid of the propellant channel housing, which delimits the propellant channel in certain areas, forms a deviation which renders the longitudinal central axis of the propellant channel at the propellant inlet different from the longitudinal central axis of the propellant channel at the propellant outlet.

7. The compressor arrangement according claim 1, wherein, at the first connection, the propellant inlet connection is designed to mount flush against a through opening which extends through a contact surface of the compressor housing.

8. The compressor arrangement according to claim 7, wherein a longitudinal central axis of the propellant channel at the propellant inlet is different from a longitudinal central axis of the propellant channel at the propellant outlet.

9. The compressor arrangement according to claim 8, wherein a lid of the propellant channel housing, which delimits the propellant channel in certain areas, forms a deviation which renders the longitudinal central axis of the propellant channel at the propellant inlet different from the longitudinal central axis of the propellant channel at the propellant outlet.

10. The compressor arrangement according to claim 1, wherein the propellant channel housing is secured to the compressor housing by at least one screw, and
    wherein a longitudinal central axis of a receiving opening of the propellant channel housing for receiving the at least one screw is arranged parallel to at least one of the longitudinal central axis of the propellant channel at the propellant inlet connection and the longitudinal central axis of the propellant channel at the propellant outlet connection.

11. The compressor arrangement according to claim 10, wherein the longitudinal central axis of the propellant channel at the propellant inlet connection is perpendicular to the longitudinal central axis of the propellant channel at the propellant outlet connection or to a plane receiving the propellant outlet connection.

12. The compressor arrangement according to claim 7, wherein the propellant inlet connection comprises an axial ring which seals against the contact surface and the propellant outlet connection includes a radial ring which seals against the plug connection receptacle.

13. The compressor arrangement according to claim 12, wherein a longitudinal central axis of the propellant channel at the propellant inlet is different from a longitudinal central axis of the propellant channel at the propellant outlet.

14. The compressor arrangement according to claim 13, wherein a lid of the propellant channel housing, which delimits the propellant channel in certain areas, forms a deviation which renders the longitudinal central axis of the propellant channel at the propellant inlet different from the longitudinal central axis of the propellant channel at the propellant outlet.

15. A method for operating a compressor arrangement for an internal combustion engine comprising:
    detecting a leakage by evaluating a pressure measured by a pressure sensor and determining whether the pressure falls below or exceeds a predetermined threshold,
    wherein the compressor arrangement comprises a compressor, which is arranged in a compressor housing and which has a low pressure side and a high pressure side, and a vacuum supply device, which comprises a propellant channel and a vacuum channel,
    wherein the propellant channel comprises a nozzle which is fluidically connected to a propellant inlet connection and to a propellant outlet connection, wherein the vacuum channel fluidically opens into the propellant channel between the propellant inlet connection and the propellant outlet connection, wherein the propellant inlet connection connects the propellant channel to the high pressure side of the compressor at a first connection, and the propellant outlet connection connects the propellant channel to the low pressure side of the compressor at a second connection, wherein the propellant channel is arranged in a propellant channel housing, which is separate from the compressor housing and which is configured to attach to the compressor housing, wherein, at the second connection, the propellant outlet connection is designed to plug into a plug connection receptacle formed in the compressor housing, wherein a longitudinal central axis of the propellant channel at the propellant inlet is different from a longitudinal central axis of the propellant channel at the propellant outlet, and wherein a lid of the propellant channel housing, which delimits the propellant channel in certain areas, forms a deviation which renders the longitudinal central axis of the propellant channel at the propellant inlet different from the longitudinal central axis of the propellant channel at the propellant outlet.

* * * * *